July 13, 1926.
C. C. PAPENDRY
1,592,744
COMBINATION BEVERAGE DISPENSING DEVICE
Filed Nov. 1, 1924  2 Sheets-Sheet 1
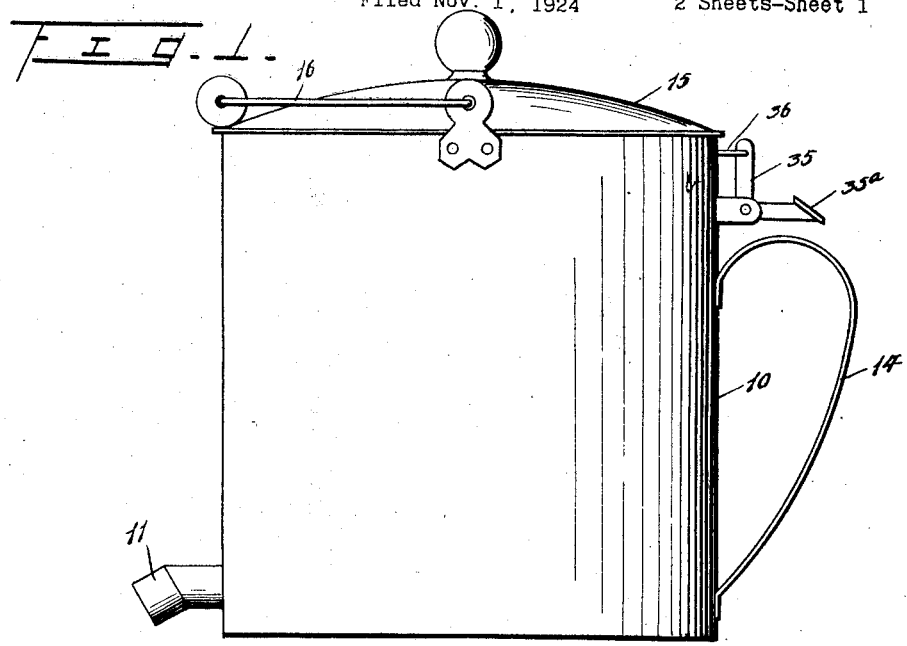
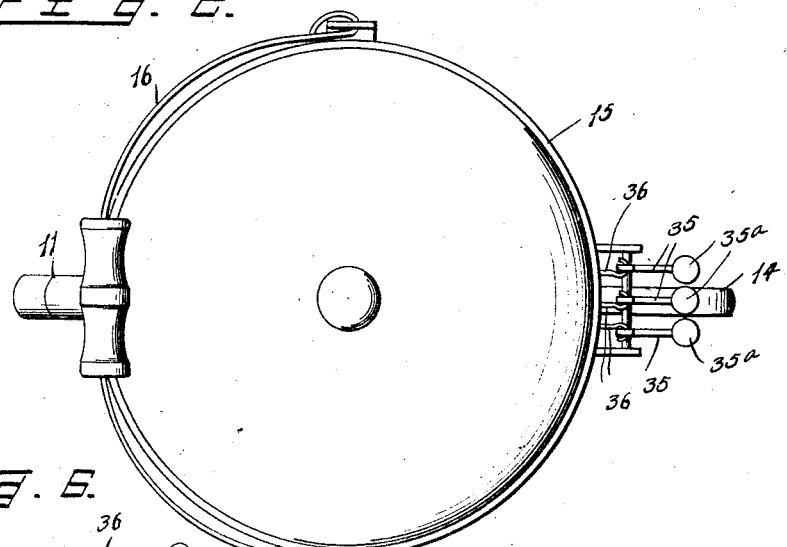
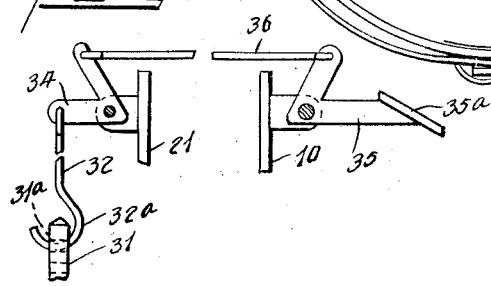
Inventor
C. C. Papendry,
By
Attorney

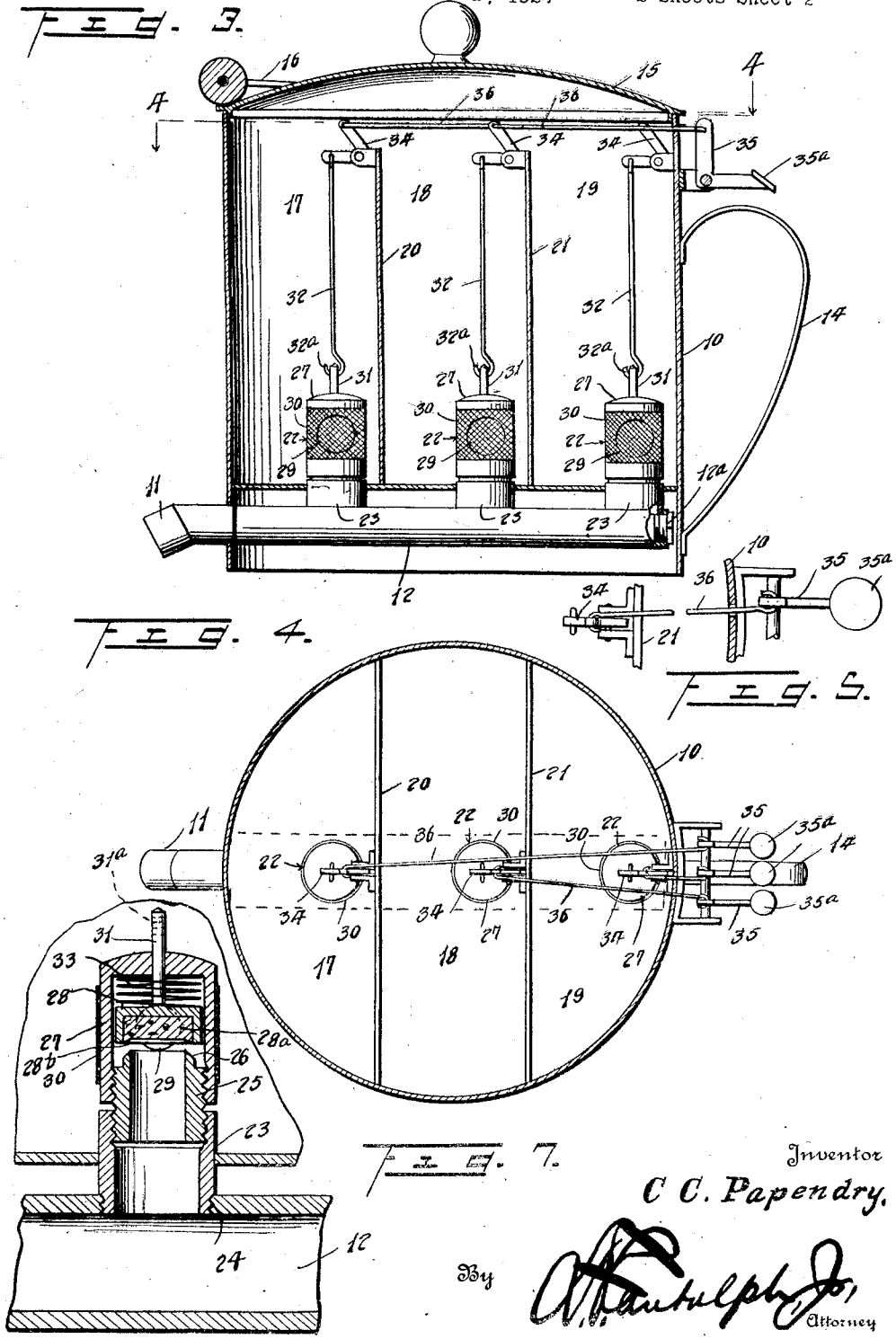

Patented July 13, 1926.

1,592,744

UNITED STATES PATENT OFFICE.

CHARLES COSMO PAPENDRY, OF EAST LIVERPOOL, OHIO.

COMBINATION BEVERAGE-DISPENSING DEVICE.

Application filed November 1, 1924. Serial No. 747,286.

The object of the invention is to provide a coffee pot or similar receptacle of the multiple compartment type from which a plurality of different beverages may be dispensed selectively by the operator without confusion or mixing of flavors, and which is especially adapted for use in hotels, restaurants, lunch rooms and also domestically to suit different tastes and preferances of the customers or guests, with a view to avoiding the necessity of employing a plurality of separate receptacles or dispensing means in catering to a number of people; and with these objects in view the invention consists in a construction and combination of parts of which a typical embodiment is illustrated in the accompanying drawings, wherein:—

Figure 1 is a side view in elevation,

Figure 2 is a plan view,

Figure 3 is a vertical sectional view,

Figure 4 is a horizontal sectional view on a plane indicated by the line 4—4 of Figure 3, Figures 5 and 6 are fragmental views in plan and elevation, respectively, of the valve actuating mechanisms, and Figure 7 is a detail sectional view particularly showing one of the valve mechanisms in central vertical section taken longitudinally with respect to the dispensing tube.

The receptacle or pot 10 may be of any shape or dimensions suitable to the purpose for which the device is designed and it is provided near its bottom at the front side with a dispensing spout 11 which is a continuation of a dispensing tube 12 extending longitudinally of the receptacle close beneath its bottom 13 and having a plug 12$^a$ screwed in one end. A manipulating handle 14 is arranged at the rear end or the end opposite to that carrying the spout 11. A removable top or cover is fitted on the receptacle and for carrying purposes the latter is provided with a suitable bail 16.

The receptacle is interiorly sub-divided to form compartments of which any desired number may be provided, and of which three are shown in the drawing and respectively designated as 17, 18, and 19, and which obviously may be of any desired relative proportions to suit the relative quantities of different beverages which are to be prepared or deposited therein for selective dispensing through spout 11. These compartments are formed by partitions indicated at 20 and 21, arranged transversely of the receptacle and in each compartment there is arranged a valve mechanism 22 affording communication between said compartment and the dispensing tube 12 to the end that an outlet from each of the compartments may be provided through the common dispensing tube.

Each of the valve mechanisms 22 includes a tube 23 threaded into an opening 24 in tube 12, an exteriorly threaded tube 25 screwed into the upper end of tube 23 and provided with a valve seat 26, and a cap portion 27 screwed on to threaded tube 25 that encloses valve 28. Cap 27 is provided with one or more openings 29 providing ingress to the valve mechanism, and 30 designates a screen covering the opening or openings 29.

Valve 28 is of the inverted cup type and provided with packing 28$^a$ of cork or other suitable material, the under side of the packing being provided with a recess 28$^b$ with inclined walls to receive valve seat 26. 31 is the valve stem extending through an opening in the top of cap 27 and formed with an eye 31$^a$ to receive the hooked end 32$^a$ of rod 32. 33 designates a spring that actuates valve 28 into seating position.

Rods 32 pivotally engage one arm of a bell crank lever 34, the other arm of the lever 34 being connected to one of a series of bell crank levers 35, fulcrumed on the rear of the receptacle 10, by means of rods 36. Each of the bell-crank levers 35 is provided with a thumb plate 35$^a$ for manipulation thereof by the dispenser of the beverages from the receptacle, said thumb plates being conveniently arranged adjacent to handle 14 for the purpose stated.

It will be understood that the construction of the dispensing tube 12 with the removable plug 12$^a$ and the removable valve mechanisms 22 provide for readily cleaning the tube and valve mechanisms. The packing 28$^a$ may also be replaced when worn.

Having thus described the invention, what I claim as new is:

A beverage dispensing vessel having a receptacle of compartmental construction, said receptacle below its bottom wall having a laterally disposed dispensing tube, pipes secured in the bottom wall of the receptacle and extending into the respective compartments and securing the tube in place, valve seat members within the receptacle secured to the upper ends of the pipes, removable valves engaging said seats, removable caps positioning said valves and secured to said valve seat members, a removable plug for the inner end of the dispensing tube, levers secured adjacent the upper ends of the compartments, actuating elements movable above the compartments and connected to the levers, connections between said levers and the valves, and members to operate said connections from the exterior of the receptacle.

In testimony whereof I affix my signature.

CHARLES COSMO PAPENDRY.